United States Patent
Kakizaki et al.

(10) Patent No.: US 6,839,480 B2
(45) Date of Patent: Jan. 4, 2005

(54) OPTICAL SWITCHING APPARATUS, OPTICAL TRANSMISSION SYSTEM AND METHOD OF SETTING UP FOR OPTICAL SIGNAL ROUTE

(75) Inventors: Sunao Kakizaki, Kawasaki (JP); Hideaki Tsushima, Komae (JP); Shigeki Kitajima, Kawasaki (JP); Yasuyuki Fukashiro, Yokohama (JP); Takashi Mori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/684,371

(22) Filed: Oct. 15, 2003

(65) Prior Publication Data

US 2004/0081460 A1 Apr. 29, 2004

Related U.S. Application Data

(62) Division of application No. 10/092,734, filed on Mar. 8, 2002.

(30) Foreign Application Priority Data

Jan. 30, 2002 (JP) ..................................... 2002-020881

(51) Int. Cl.[7] ................................................ G02B 6/26
(52) U.S. Cl. ............................. 385/16; 385/17; 385/24; 398/140; 398/145
(58) Field of Search ....................... 385/15–24; 398/140, 398/141, 145

(56) References Cited

U.S. PATENT DOCUMENTS

| 4,878,726 | A | * | 11/1989 | Fatehi | ........................ | 385/16 |
| 5,764,405 | A | * | 6/1998 | Alphonsus | ............. | 359/341.33 |
| 2003/0118272 | A1 | * | 6/2003 | Tsushima et al. | ............. | 385/16 |
| 2003/0170028 | A1 | * | 9/2003 | Mori et al. | .................. | 398/79 |

FOREIGN PATENT DOCUMENTS

| JP | 6-311112 | 11/1994 |
| JP | 6-350542 | 12/1994 |

* cited by examiner

*Primary Examiner*—Phan T. H. Palmer
(74) *Attorney, Agent, or Firm*—McDermott Will & Emery LLP

(57) ABSTRACT

In an optical switching apparatus having redundantly-arranged optical switches, a route switching operation mode, an autonomic redundant switching operation mode and a compulsory redundant switching operation mode are discriminated from one another so that these operation modes are prevented from being executed at the same time, and also proper mask processing is performed at every switching operation mode. Therefore, emission of an undesired alarm and thus occurrence of malfunction when each switching operation is carried out can be prevented.

2 Claims, 12 Drawing Sheets

FIG.3

| PERFORMANCE MONITORING PORTION | | 410-1x | | | 410-2x | | | 410-3x | | | 410-4x | | | 410-5x | | | 410-6x | | |
|---|---|---|---|---|---|---|---|---|---|---|---|---|---|---|---|---|---|---|---|
| MONITORING ITEM | PORT NUMBER | POW | BER | SNR | Q-VALUE | POW | BER | SNR | Q-VALUE | POW | BER | SNR | Q-VALUE | POW | BER | SNR | Q-VALUE | POW | BER | SNR | Q-VALUE |
| x=1 | 0 | 0 | 0 | 0 | 0 | 0 | 0 | 0 | 0 | 0 | 0 | 1 | 1 | 1 | 1 | 0 | 0 | 0 | 0 | 1 | 1 | 1 |
| x=2 | 0 | 0 | 0 | 0 | 0 | 0 | 0 | 0 | 0 | 0 | 0 | 0 | 1 | 1 | 0 | 0 | 0 | 0 | 0 | 0 | 1 | 0 |
| x=3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ⋮ | | | | | | | | | | | | | | | | | | | | | | |
| x=n | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

1: ALARM
0: NO ALARM

POW: OPTICAL POWER INTERRUPTION
BER: BIT ERROR ABNORMALITY
SNR: SIGNAL/NOISE RATIO ABNORMALITY
Q-VALUE: Q-VALUE ABNORMALITY

| PERFORMANCE MONITORING PORTION | 410-1x | | | | 410-2x | | | | 410-3x | | | | 410-4x | | | | 410-5x | | | | 410-6x | | | |
|---|---|---|---|---|---|---|---|---|---|---|---|---|---|---|---|---|---|---|---|---|---|---|---|---|
| MONITORING ITEM / PORT NUMBER | POW | BER | SNR | Q-VALUE | POW | BER | SNR | Q-VALUE | POW | BER | SNR | Q-VALUE | POW | BER | SNR | Q-VALUE | POW | BER | SNR | Q-VALUE | POW | BER | SNR | Q-VALUE |
| x=1 | 0 | 0 | 0 | 0 | 1 | 1 | 1 | 1 | 1 | 1 | 1 | 1 | 0 | 0 | 0 | 0 | 0 | 0 | 0 | 0 | 0 | 0 | 0 | 0 |
| x=2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| x=3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| x=n | 0 | 0 | 0 | 0 | 0 | 0 | 0 | 0 | 0 | 0 | 0 | 0 | 1 | 0 | 0 | 0 | 1 | 1 | 1 | 1 | 1 | 1 | 1 | 1 |

1: MASK PROCESSING
0: NO MASK PROCESSING

POW: OPTICAL POWER INTERRUPTION
BER: BIT ERROR ABNORMALITY
SNR: SIGNAL/NOISE RATIO ABNORMALITY
Q-VALUE: Q-VALUE ABNORMALITY

FIG.10

| PERFORMANCE MONITORING PORTION | 410-1x | | | | 410-2x | | | | 410-3x | | | | 410-4x | | | | 410-5x | | | | 410-6x | | | |
|---|---|---|---|---|---|---|---|---|---|---|---|---|---|---|---|---|---|---|---|---|---|---|---|---|
| MONITORING ITEM / PORT NUMBER | POW | BER | SNR | Q-VALUE | POW | BER | SNR | Q-VALUE | POW | BER | SNR | Q-VALUE | POW | BER | SNR | Q-VALUE | POW | BER | SNR | Q-VALUE | POW | BER | SNR | Q-VALUE |
| x=1 | 0 | 0 | 0 | 0 | 0 | 0 | 0 | 0 | 0 | 0 | 0 | 0 | 1 | 1 | 1 | 1 | 0 | 0 | 0 | 0 | 1 | 1 | 1 | 1 |
| x=2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| x=3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| x=n | 0 | 0 | 0 | 0 | 0 | 0 | 0 | 0 | 0 | 0 | 0 | 0 | 1 | 1 | 1 | 1 | 0 | 0 | 0 | 0 | 1 | 1 | 1 | 1 |

1: MASK PROCESSING
0: NOMASK PROCESSING

POW: OPTICAL POWER INTERRUPTION
BER: BIT ERROR ABNORMALITY
SNR: SIGNAL/NOISE RATIO ABNORMALITY
Q-VALUE: Q-VALUE ABNORMALITY

FIG.11

| PERFORMANCE MONITORING PORTION | 410-1x | | | | 410-2x | | | | 410-3x | | | | 410-4x | | | | 410-5x | | | | 410-6x | | | |
|---|---|---|---|---|---|---|---|---|---|---|---|---|---|---|---|---|---|---|---|---|---|---|---|---|
| MONITORING ITEM / PORT NUMBER | POW | BER | SNR | Q-VALUE | POW | BER | SNR | Q-VALUE | POW | BER | SNR | Q-VALUE | POW | BER | SNR | Q-VALUE | POW | BER | SNR | Q-VALUE | POW | BER | SNR | Q-VALUE |
| x=1 | 0 | 0 | 0 | 0 | 1 | 1 | 1 | 1 | 1 | 1 | 1 | 1 | 0 | 0 | 0 | 0 | 0 | 0 | 0 | 0 | 0 | 0 | 0 | 0 |
| x=2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| x=3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| x=n | 0 | | | 0 | 0 | 0 | 0 | 0 | 0 | 0 | 0 | 0 | 1 | 1 | 1 | 1 | 1 | 1 | 1 | 1 | 1 | 1 | 1 | 1 |

1: MASK PROCESSING
0: NO MASK PROCESSING

POW: OPTICAL POWER INTERRUPTION
BER: BIT ERROR ABNORMALITY
SNR: SIGNAL/NOISE RATIO ABNORMALITY
Q-VALUE: Q-VALUE ABNORMALITY

OPTICAL SWITCHING APPARATUS, OPTICAL TRANSMISSION SYSTEM AND METHOD OF SETTING UP FOR OPTICAL SIGNAL ROUTE

This application is a divisional application Ser. No. 10/092,734, filed Mar. 8, 2002.

BACKGROUND OF THE INVENTION

The present invention relates to an optical switching apparatus and an optical transmission system using the same, and a method of setting up for an optical signal route in the optical switching apparatus.

In order to support rapid increase in data traffic represented by the Internet and also rapid increase in demands for multimedia communications for images/sounds/data, transmission lines and telecommunication nodes constituting communication networks are promoted to be higher speed operation and larger capacity operation, and introduction of optical communication apparatuses using optical fibers and optical signals is also promoted.

Further, optical switching apparatuses called as an optical cross connect (hereinafter referred to as "OXC") and an optical add-drop multiplexing apparatus (hereinafter referred to as "OADM") with which optical signals are subjected to the switching processing such as transmission route switching/line switching, etc. without converting the optical signals to electrical signals are considered to be practically used in place of a conventional communication apparatus for temporarily converting optical signals to electrical signals and then processing the electrical signals.

When an optical switching apparatus as described above is practically used, it is important to provide an apparatus which is enhanced not only in basic performance of suppressing loss of optical signals power, but also in reliability, availability and serviceability performance (hereinafter referred to as "RAS"). For example, there is considered such a construction that the performance of signals to be transported are monitored at a proper position, or such a construction that a redundant structure (for example, doubling) is adopted for a part of the apparatus and the route of signals is properly switched when the apparatus breaks down or the performance thereof is deteriorated.

The RAS enhancing means described above is practically used in conventional transmission apparatus and digital exchange in which data are processed in the form of electrical signals. For example, in the conventional transmission apparatus using the electrical signal processing, it is little necessary to consider the time which is required to switch the route of signals by an electrical switch. Therefore, it is relatively easy to perform the switching operation with neither data lack nor data duplication (power-uninterruption) and a power-uninterruption switching function using a buffering technique based on a memory or the like is known.

As described above, optical signals are directly processed in OXC and OADM, and a mechanical type optical switch which is low insertion loss is frequently used as an optical switch serving as a main part for setting a route. However, it is known that the mechanical type optical switch has a lower optical switching speed as compared with the transmission speed of optical signals to be transmitted therethrough and several milli-seconds are needed to change the route. If the same signal route switching operation as the conventional apparatus based on the electrical signal processing is performed in OXC or OADM which directly processes the optical signals, there would occur a power-interruption that no optical signal is output during the route switching operation for the optical signals because of the low switching speed of the optical switch as described above and thus the optical signals corresponding to an extremely large amount of data are not passed through the optical switch concerned and thus lost. Accordingly, it is required to implement an optical signal switching apparatus having excellent RAS in consideration of the power-interruption inherent to the apparatus due to the optical signal processing as described above.

In OXC and OADM, a monitoring portion for monitoring various monitoring items such as (1) power deterioration/interruption of optical signals, (2) the synchronous state of operating clocks, (3) the synchronous state of optical signal frames, (4) the bit error rate of optical signals (hereinafter may be referred to as "BER"), etc. is provided in order to keep the performance of the optical signals to be processed. When the monitoring portion detects a failure, the route of the optical signals may be switched to a normal one to thereby enhance RAS.

However, according to the apparatus having such a failure monitoring function, when the route setting is changed to enhance RAS, an unnecessary optical signal power interruption alarm, a bit error rate abnormality alarm, an out-of-sync alarm or the like may be detected in accordance with the switching speed of the optical switch, the setup position of the monitoring portion and the monitoring method.

Further, in a transmission system such as SONET/SDH or the like, monitoring control information is received/transmitted separately from main signals between respective apparatuses constituting a network. Therefore, there may occur such a situation that an undesired alarm detected when the route switching is carried out as described above is informed as an error alarm to an apparatus located at the downstream side in the travel direction of optical signals or an apparatus for monitoring and managing failures of the network even though the switching operation of the optical switch is normal.

Still further, the monitoring portion checks normality of a new route after the route switching operation is carried out when some failure occurs, and also monitors a restoration status of the old route under failure. Accordingly, if the monitoring is not carried out in consideration of the time required for the switching operation of the optical switch and the operation time of the failure monitoring function, an error alarm may be informed to an apparatus at the downstream side or a monitoring apparatus.

In such a case, even though a newly-switched route is normal, the switching operation is induced to switch to another route again, so that the operations of individual apparatuses such as OXC, OADM, etc. and the operation of a communication system (network) using these apparatuses may be made unstable.

SUMMARY OF THE INVENTION

According to the present invention, respective switching operation modes for switching of a route setting and autonomic switching a redundant system and compulsory switching operations of are discriminated from one another so that the switching operations of these modes are not simultaneously carried out. Further, proper mask processing is performed every switching operation. Still further, control information on each switching operation is allowed to be received/transmitted between counter apparatuses.

BRIEF DESCRIPTION OF THE DRAWINGS

Preferred embodiments of the present invention will now be described in conjunction with the accompanying drawings, in which;

FIG. 3 shows a bit map showing an example of the content of a alarm register of the optical switching apparatus of the embodiment according to the present invention;

FIG. 7 shows a bit map showing an example of the content of a mask managing memory of the optical switching apparatus of the embodiment according to the present invention;

FIG. 8 shows a bit map showing an example of the content of a mask register of the optical switching apparatus of the embodiment according to the present invention;

FIG. 10 shows a bit map showing an example of the content of the mask register of the optical switching apparatus according to the embodiment of the present invention;

FIG. 11 shows a bit map showing an example of the content of the mask register of the optical switching apparatus according to the embodiment of the present invention.

DETAILED DESCRIPTION OF THE PREFERRED EMBODIMENTS

Preferred embodiments of the construction of an optical switching apparatus according to the present invention and a method of using the apparatus will be described in detail with reference to the accompanying drawings.

Figure 1:
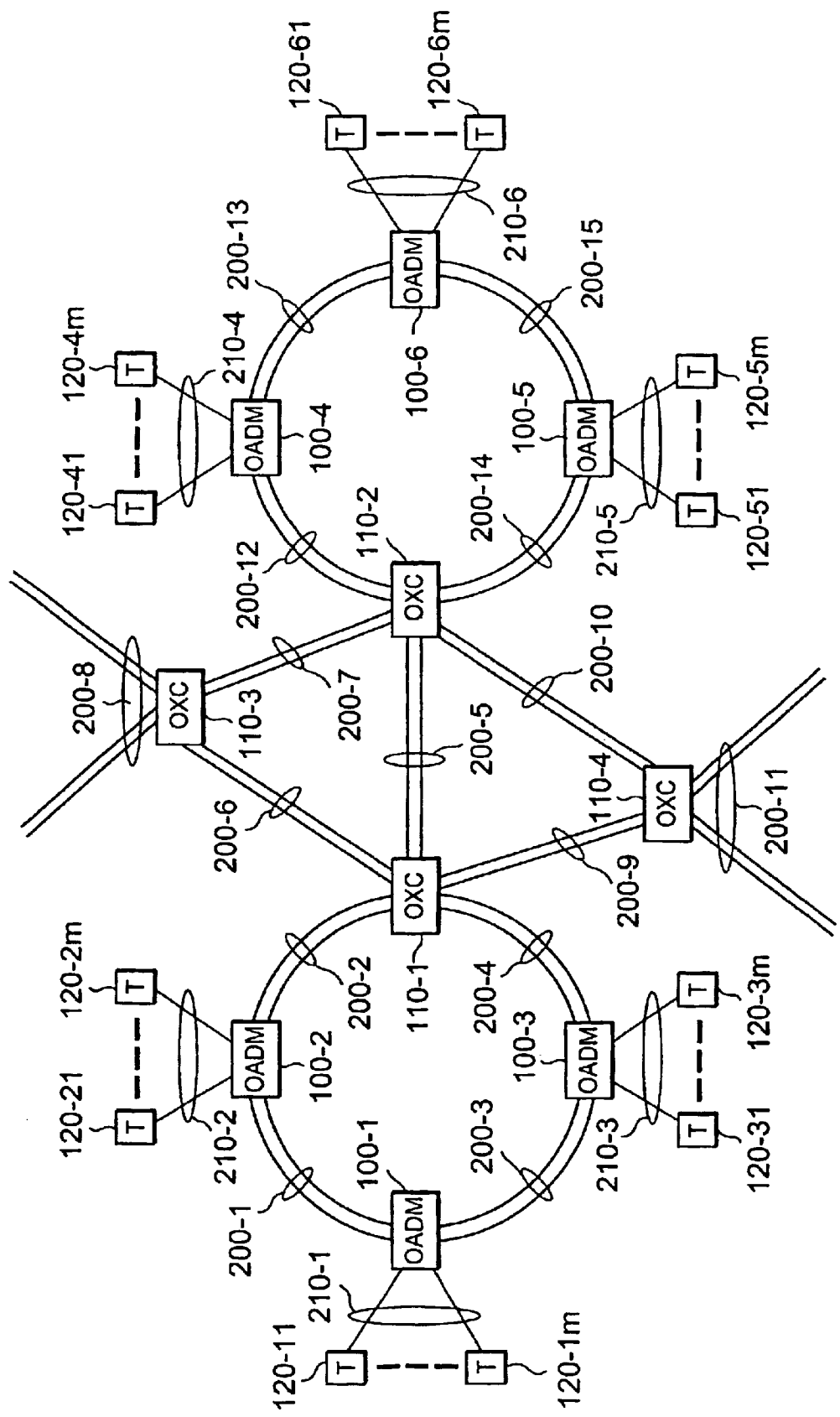
FIG. 1 is a network construction diagram showing the construction of a communication network having an optical switching apparatus according to an embodiment of the present invention.

FIG. 1 is a diagram showing the construction of a communication network in which an optical signal switching apparatus is used.

Each of optical switching apparatuses 100, 110 of this embodiment is connected to communication terminals (T) 120 working under the optical switching apparatus through optical fibers 210, and also mutually connected to other optical switching apparatuses 100, 110 through optical fibers 200, thereby constructing a communication network. As specific using styles are known an optical cross connect apparatus (OXC) 110 for switching the routes of multiplexed optical signals received from respective optical fibers 200 to optical fibers 200 serving as addresses every signal and outputting these optical signals with being multiplexed, and an optical add-drop multiplexing apparatus (OADM) 100 in which an optical signal needed every terminal 120 connected to the optical add-drop multiplexing apparatus concerned (self apparatus) is switched (inserted/removed) from multiplexed optical signals received from an optical fiber 200 and then the optical signal thus switched is transmitted/received by using an optical fiber 210.

According to the optical switching apparatus of this embodiment, by properly selecting constituent parts, a communication network having a flexible configuration which can support various transmission speeds and various multiplex degrees of optical signals can be easily constructed. Further, it is needless to say that the optical switching apparatus of this embodiment has no restriction in the presence or absence of wavelength multiplexing and the multiplex number of wavelengths.

Next, the construction of the optical switching apparatus of this embodiment used as OADM or OXC shown in FIG. 1 will be described.

Figure 2:
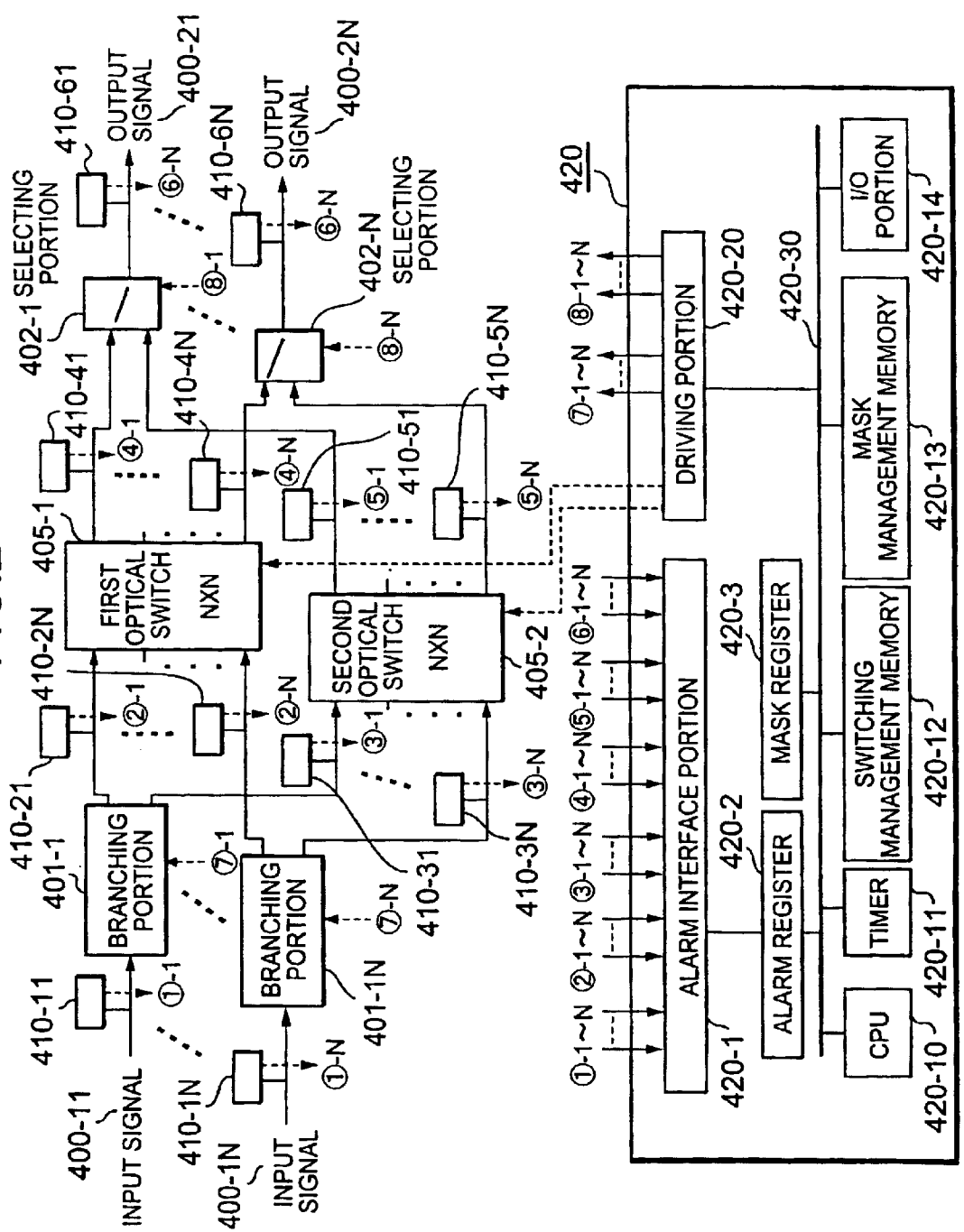
FIG. 2 is a basic construction diagram of the optical switching apparatus of the embodiment according to the present invention.

FIG. 2 shows the basic construction of the optical switching apparatus of this embodiment.

In the optical switching apparatus of this embodiment, for obtaining high reliability of the apparatus, a matrix switch for setting a route for an optical signal is redundantly constructed by a first optical switch 405-1 and a second optical switch 405-2. In this embodiment, the number of input/output ports of the matrix switch is set to N (N×N), and the ratio of the number of switches being actually used and the number of spare switches is set to 1:1. However, only one spare switch may be provided for plural (M) switches being actually used (that is, the ratio is set to M:1).

Branching portions 401 are provided for N input optical signals 400-11 to 400-1N for the apparatus, and have the function of connecting each input optical signal to any one of the redundantly-arranged first optical switch 405-1 and second optical switch 405-2. Specifically, each branch portion 401 may be constructed by an optical switch having input/output ports shoes number is equal to 1×2, or electrical switch having input/output ports whose number is equal to 1×2 and an optical/electrical converter and an electrical/optical converter which are disposed respectively front and rear the electrical switch. Further, in the case of a hot standby system as described later, each branch portion 401 may comprise an optical coupler or the like.

Each of selecting portions 402 of N is provided in association with each output port unit of the first and second optical switches 405-1 and 405-2 (that is, each selecting portion 402 is connected to one output terminal of the first optical switch 405-1 and one output terminal of the second optical switch 405-2) to select a signal for which the route is set by any one of both the optical switches 405-1 and 405-2, and outputs the signal as an output optical signal (400-21 to 2N) to the outside of the apparatus. Specifically, each selecting portion 402 may comprise an optical switch having input/output ports shoes number is equal to 1×2, or electrical switch having input/output ports whose number is equal to 2×1 and an optical/electrical converter and an electrical/optical converter which are disposed respectively of front and rear of the electrical switch.

There are two cases for the function of each of the branching portions 401. One case is that optical signals are output from the branching portion 401 to only one of the redundantly-arranged systems as described above (hereinafter referred to as "cool standby system"), and the other case is that optical signals are output from the branching portion 401 to both the redundantly-arranged systems (hereinafter referred to as "hot standby system"). This embodiment will be described on the assumption that each branching portion adopts the cool standby system and each of the selecting portions 402 and the branching portions 401 uses an optical switch.

Reference numeral 410 represents a performance monitoring portion, and the contents to be monitored by the performance monitoring portions 410 are the intensity of the optical signal, an optical-signal/noise ratio (OSNR), measurement values of Q-value serving as one of quality parameters in optical communications, bit error rate (BER), etc.

A controller 420 performs the control of the route setting of the first and second optical switches 405, the switching control of the branching portions 401 and the selecting portions 402, and the processing of alarms collected by the performance monitoring portions 410, etc.

An alarm interface portion 420-1 collects alarm information from each performance monitoring portion 410, and writes it into a alarm register 420-2. FIG. 3 shows an example of a bit map of a alarm register. The items to be monitored contain optical signal intensity abnormality (POW), BER abnormality (BER), OSNR abnormality (SNR) and Q-value abnormality (Q-value). The example of FIG. 3 corresponds to a case where abnormality occurs due to break-down or the like in the output ports 1 and 2 of the first optical switch 405-1.

All the alarms are detected in the performance monitoring portion 410-41 which is directly connected to the output port 1 of the first optical switch 405-1, and BER abnormality and OSNR abnormality are detected in the performance monitoring portion 410-42 which is directly connected to the output port 2 (shown in FIG. 3.). Further, all the alarms are observed in the performance monitoring portion 410-61 at the subsequent stage, and only OSNR abnormality is detected in the performance monitoring portion 410-61.

A mask register 420-3 stores some alarm information of the alarm information detected by the performance monitoring portion, which should be masked (subjected to mask processing) so that they are not handled as alarm information under a specific condition.

CPU 420-10 performs comprehensive control of the switching apparatus of this embodiment. A timer 420-11 measures the continuation time of the mask processing described above, and specifically, it comprises an up-counter for starting a count operation in response to an instruction of CPU or the like. A switching management memory 420-12 manages the setup state of the communication route in the first and second optical switches 405, the branching portions 401 and the selecting portions 402. The mask management memory 420-13 presets and stores a mask pattern for determining the presence or absence of the mask processing and the continuation time of the mask processing which are predetermined every alarm information collected by the performance monitoring portions in each operation status of the optical switching apparatus described later. An I/O portion 420-14 is an interface between the optical switching apparatus of this embodiment and the external.

A driving portion 420-20 transmits driving signals to the first and second optical switches 405, the branching portions 401 and the selecting portions 402 in response to an instruction from CPU 420-10 when a route switching operation described later or an autonomic (compulsory) redundant switching operation is carried out. Accordingly, if the input interface of the driving signals for the optical switches, etc. is regulated on the basis of analog signals, the optical switch driving portion 420-20 necessarily has the digital-to-analog conversion (DA conversion) function.

Next, prior to description on the operation of the optical switching apparatus of this embodiment, the route switching operation, the autonomic switching operation and the compulsory switching operation will be described.

In this embodiment, the route switching operation is defined as an operation of intentionally altering the setting of the communication route of the first or second optical switch 405 on the basis of a request from the manager of a network or a user. For example, it corresponds to a case where by OXC 110-1 of FIG. 1 the state that a signal received from the transmission route 200-2 is connected to a signal to be output to the transmission route 200-5 is changed to the state that a signal received from the transmission route 200-2 is connected to a signal to be output to the transmission route 200-9.

Such a route switching operating is carried out by altering the route setting of the first or second optical switch 405 shown in FIG. 2. The switching control of the optical switch is carried out by transmitting the driving signal from CPU 420-10 through the driving portion 420-20 to the optical switch on the basis of a switching request from the external.

Further, the autonomic redundant switching operation in this embodiment means that when abnormality (break-down) in the in-use first optical switch 405-1 or the in-use second optical switch 405-2 is recognized on the basis of alarm information from the performance monitoring portion or the like, the apparatus autonomically (with no instruction/no operation of the manager) switches the current optical switch to the optical switch of the system under no use in order to keep normality of subsequent communications. Of course, the manager can compulsorily switch the system of the current optical switch to another system without any break-down. In this embodiment, such a switching operation will be referred to as "compulsory redundant switching" in order to discriminate it from the autonomic redundant switching operation.

In this specification, in the redundantly-arranged apparatuses, an apparatus being actually used will be referred to as "in-use apparatus", and an apparatus which is actually on standby would be switched when some break-down occurs in the in-use apparatus will be referred to as "spare apparatus").

The compulsory redundant switching operation is carried out by switching the branching portion 401 and the selecting portion 402 to the spare system. In order to perform this control, CPU 420-10 of the controller 420 transmits the driving signal through the optical switch driving portion 420-20 to the optical switches of the branching portion 401 and the selecting portion 402 in response to the switching request from the external.

If CPU 420-10 judges it on the basis of the alarm information from each performance monitoring portion 410 or the like that some break-down occurs in the first (or second) optical switch of the in-use system, CPU transmits the driving signal through the driving portion 420-20 to the branching portion 401 and the selecting portion 402 to perform the autonomic redundant switching operation.

The compulsory redundant switching operation and the autonomic redundant switching operation can be switched on a switch basis or every connection route of the optical switch. In the latter case, there may be practically used a method of using the first optical switch 405-1 for some connection route and the second optical switch 405-2 for another connection route. In such a case, the branching portion 401 and the selecting portion 402 select the optical switches of the different systems, respectively.

Next, a mechanism of preventing occurrence of malfunction due to power-interruption of optical signals occurring in each optical switch when the route switching operation, the autonomic redundant switching operation or the compulsory switching operation is carried out will be described.

In the controller 420, the mask processing to prevent alarm to be recognized under a specific operation condition can be carried out.

That is, the monitoring result (alarm) from each performance monitoring portion 410 is temporarily written into the alarm register 420-2 through the alarm interface portion 420-1.

Alarms to be subjected to the mask processing and alarms not to be subjected to the mask processing are stored in the mask register 420-3 so as to be discriminated from each other in accordance with the alarm result of the alarm register 420-2. For even the same alarm, the presence or absence of the mask processing may be different in accordance with the operation status of the optical switching apparatus (in addition to the normal practical-use state, the route switching, the autonomic redundant switching, the compulsory redundant switching, etc.), and thus the optimum mask pattern is selected from a mask management memory 420-13 in accordance with the operation status and then stored in to the mask register 420-3 previously.

On the basis of the monitoring results written in the alarm register 420-2 and the contents of the mask register 420-3 which correspond to the respective alarm results, CPU 420-10 judges whether the alarm is an original alarm based on a break-down of the apparatus or the like (referred to as "break-down alarm") or a pseudo-alarm detected due to the switching operation or the like (referred to as "pseudo-alarm").

Alternatively, if "presence of alarm" is recorded as a numerical value "1" in the alarm register 420-2 and "presence of mask" is recorded as a numerical value "0" in the mask register 420-3, by subjecting the contents of the alarm register 420-2 and the mask register 420-3 to the logical product operation (AND operation) every corresponding alarm, it is recognized that if the logical operation result is the numerical value "1", an original alarm occurs. Accordingly, the presence or absence of the break-down alarm can be processed in a hardware style without using CPU 420-10.

Next, an operation of preventing occurrence of an undesired alarm at the route switching time of the first and second optical switches 405 or at the autonomic (compulsory) redundant switching time of the branching portion 401 and the selecting portion 402 without reducing RAS in the optical switching apparatus by using the mask processing function as described above will be described.

Figure 4:
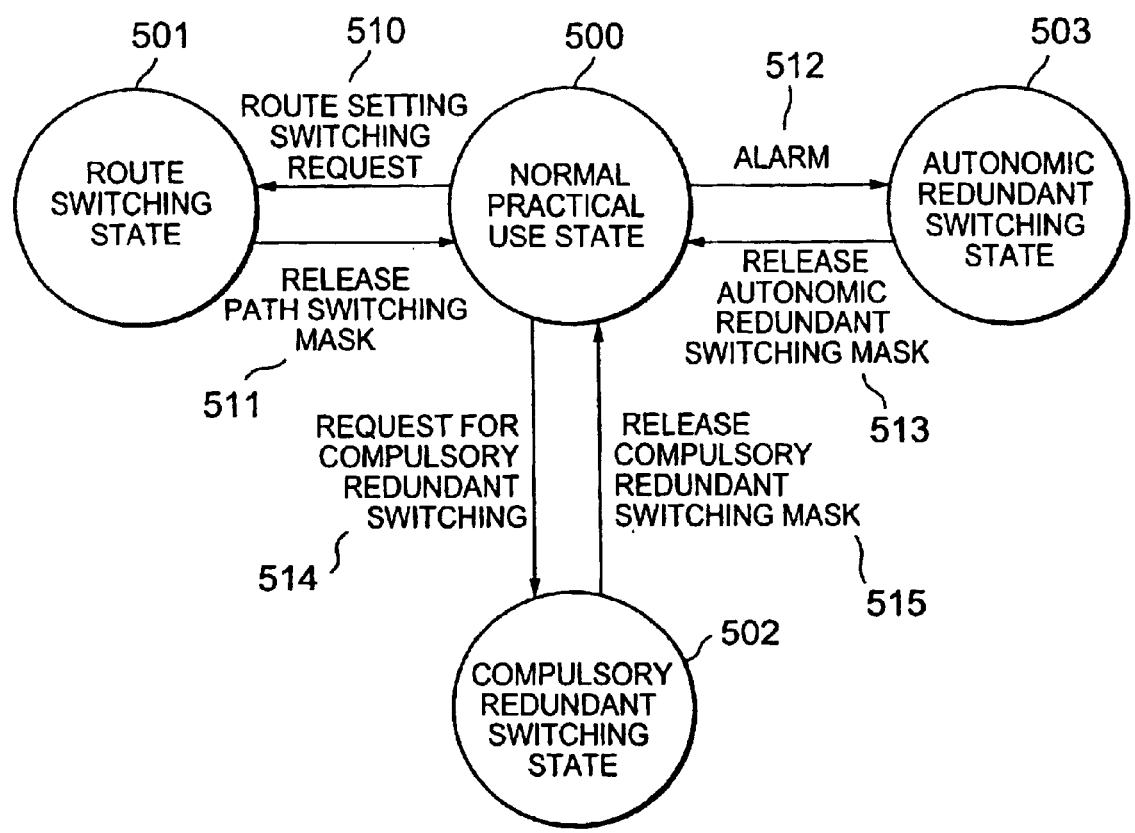
FIG. 4 is a state transition diagram of the optical switching apparatus of the embodiment according to the present invention.

First, the basic technical idea of this embodiment will be described with reference to the state transition diagram of the optical switching apparatus of this embodiment shown in FIG. 4.

The optical switching apparatus of this embodiment has four operation states, a normal practical-use state 500, a route switching state 501, a compulsory redundant switching state 502 and an autonomic redundant switching state 503. The optical switching apparatus is practically used so that these operation states are prevented from occurring simultaneously.

If there is a route setting switching request 510 in the normal practical-use state 500, the state is shifted to the route switching state 501. If a alarm mask of the route switching is released from this state (511), the state is returned to the normal practical-use state 500. Likewise, if there is a compulsory redundant switching request 514 in the normal practical-use state 500, the state is shifted to the compulsory redundant switching state 502. If a alarm mask of the compulsory redundant switching is released from this state (515), the state is returned to the normal practical-use state 500.

On the other hand, when a alarm is detected in the normal practical-use state 500 and it is judged that the alarm is caused by abnormality (break-down) of the first or second optical switching and the communications can be kept by switching to the spare system, the state is shifted to the autonomic redundant switching state 503. For example, in the case where under the state that the first optical switch 405-1 is used as the in-use system and the second optical switch 405-2 is used as the spare system, some alarm is observed in the performance monitoring portions 410-41 to 410-4N although no alarm is observed in the performance monitoring portions 410-11 to 410-1N, 410-21 to 410-2N in FIG. 2, it is judged that a break-down occurs in the first optical switch 405-1 and the autonomic redundant switching to the second optical switch 405-2 is carried out.

In order to return the state from the redundant switching state (520) to the normal practical-use state (500), it is carried out by the releasing the mask for the switching in the autonomic redundant switching operation (545).

As described above, the apparatus according to this embodiment is designed so that various operations thereof which are factors causing alarms in the apparatus are executed independently of one another, so that the break-down alarm detected due to abnormality, break-down or the like and the pseudo-alarm detected due to the switching operation on the practical use of the apparatus or the like are discriminated from each other to prevent the malfunction, etc. On the basis of this technical idea, the operation of the optical switching apparatus of this embodiment will be described in detail hereunder.

Figure 5:
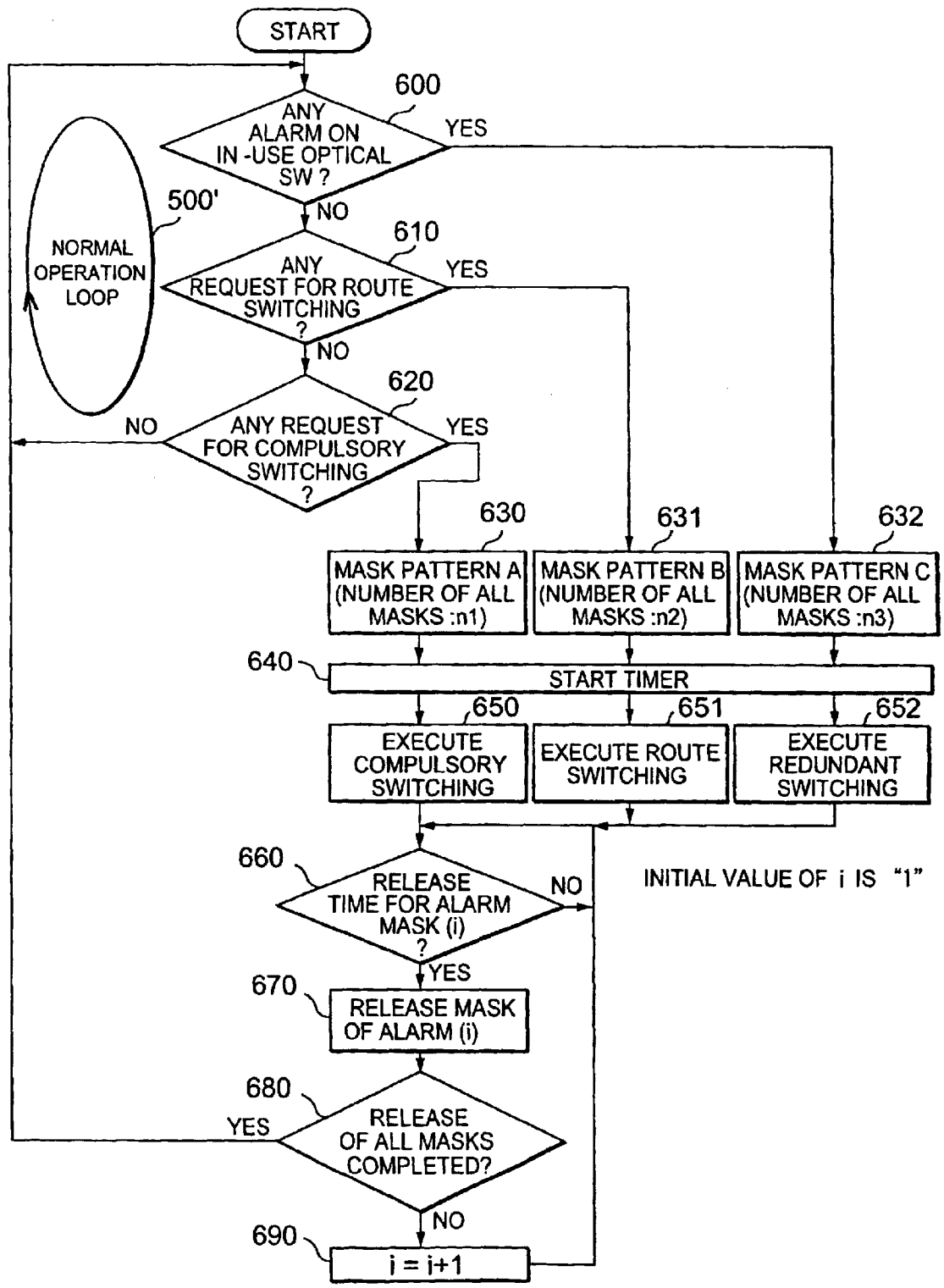
FIG. 5 is a flowchart showing the operation of the optical switching apparatus of the embodiment according to the present invention.

FIG. 5 is a flowchart on the various switching operations of the optical switching apparatus of this embodiment.

First, if no alarm caused by a break-down of the first or second optical switch 405 of the in-use system is observed ("NO" judgment in step 600), there is no request to change the route setting of both the optical switches 405 ("NO" judgment in step 610) and there is no request for the compulsory redundant switching ("NO" judgment in step 620), a normal operation loop shown by 500' is repeated. This processing corresponds to the normal practical-use state 500 shown in FIG. 4.

When another alarm which seems to be irrelative to the break-down of both the optical switches 405 is observed at each performance monitoring portions in the normal operating loop 500', some appropriate processing (not shown) associated with restoration of the failure is separately executed.

When a alarm on the optical switch of the in-use system is observed in the normal operating loop 500' ("YES" judgment in step 600), which performance monitoring portion should be subjected to the mask processing when the autonomic redundant switching operation is carried out is set as a mask pattern C (step 632).

Figure 6:
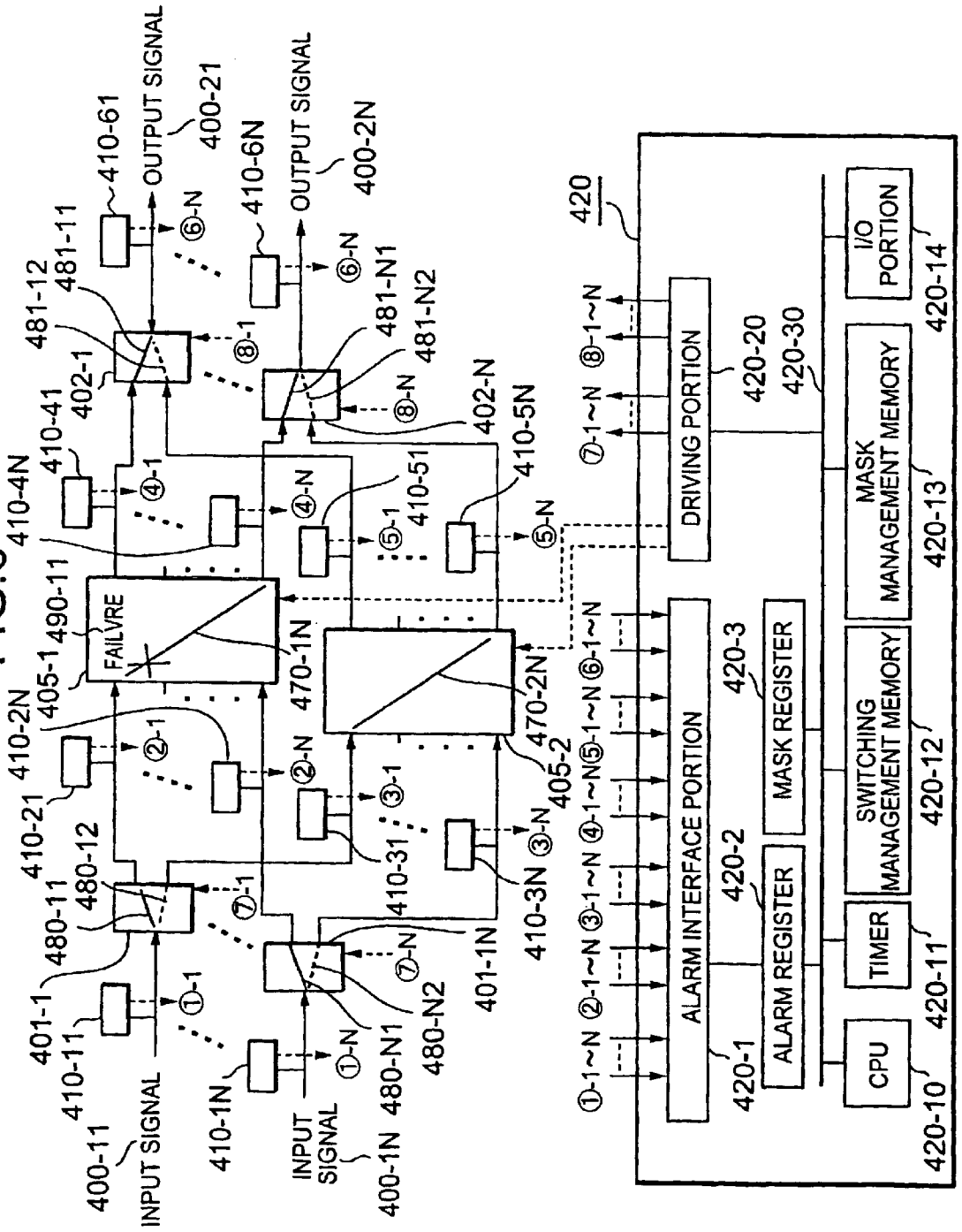
FIG. 6 is a basic construction diagram showing the operation of the optical switching apparatus of the embodiment according to the invention.

FIG. 6 shows an example case where a failure 490-11 occurs in a selecting route 470-1N of the first switch 405-1 of the in-use system and thus a alarm is observed in the performance monitoring portion 410-4N and the performance monitoring portion 410-6N at the subsequent-stage, so that the autonomic redundant switching operation is carried out to select a selecting route 470-2N of the second optical switch 405-2 as a spare route.

In the case of the cool standby system using the first optical switch 405-1 as the in-use system in FIG. 6, in order to prevent detection of any alarm caused by abnormality of the optical output intensity or the like which is caused because no optical signal reaches the performance monitoring portions 410-31 to 410-3N, 410-51 to 410-5N before the autonomic redundant switching operation, it is necessary to stop the operation of the performance monitoring portions or prohibit any action from being taken even when some alarm is detected.

In this embodiment, the autonomic redundant switching operation is carried out on a route basis, and the branching route of the branching portion 401-1 is switched from 480-11 to 480-12 while the selecting route of the selecting portion 402-N is switched from 481-N1 to 481-N2. Accordingly, in order to mask the alarm observed when the switching operation of the branching portion and the selecting portion is carried out, the mask is set to the performance monitoring portions 410-21, 410-31, 410-5N and 410-6N on these routes. With respect to the performance monitoring portion 410-4N, the failure 490-11 of the optical switch 405-1 is detected as a break-down alarm before the autonomic redundant switching operation is carried out, and thus the setting of the mask processing is set to "absence" in this case. However, there is no problem even though the mask processing is set. When the autonomic redundant switching operation is based on the hot standby system, that is, when signals are output from the branching portion 401-1 to both the first and second optical switches 405-1 and 405-2, the performance monitoring portions 410-21 and 410-31 are unnecessary.

Figure 7:
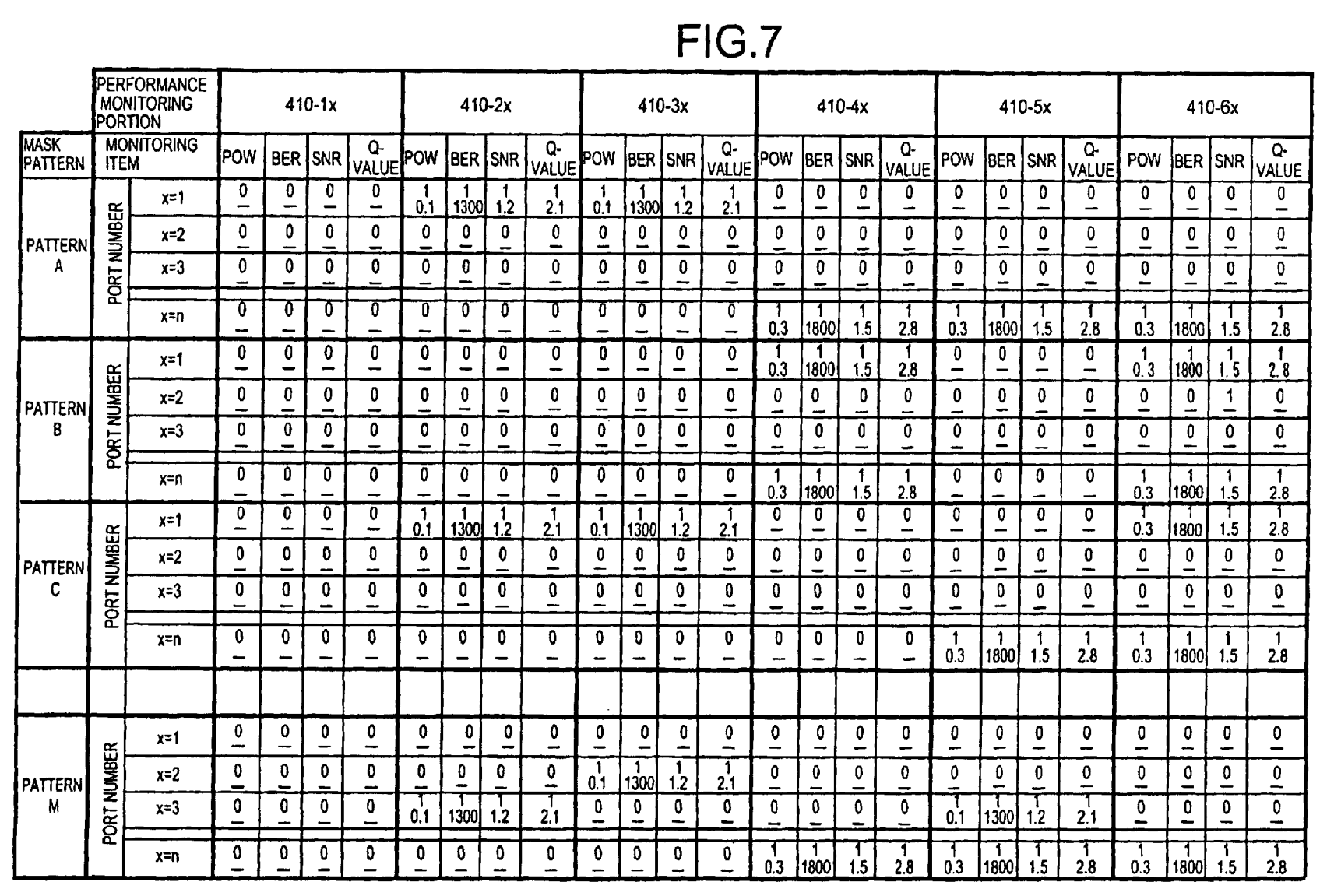

Which performance monitoring portion should be subjected to the mask setting as described above and the continuation time (duration) thereof are preset as a mask pattern in the mask management memory 420-13 shown in FIG. 6 or FIG. 2. FIG. 7 shows an example of the recording content of the mask management memory 420-13.

In FIG. 7, the numeric value "1" indicating "presence" of the mask processing and the numeric value "0" indicating "absence" of the mask processing are recorded as mask patterns A to M for every monitoring item of each performance monitoring portion 410. The numeric values at the lower stage of FIG. 7 show the continuation time (duration), and the unit thereof is milli-second: msec or the like.

For example, in a mask pattern C, the mask processing of "presence" is set to all the alarms such as optical output abnormality, BER abnormality, OSNR abnormality and Q-value abnormality for the performance monitoring portion 410-21 and the continuation time (duration) is set to 0.1, 1300, 1.2, 2.1 msec for these alarms, respectively (shown in FIG. 7). On the other hand, for the performance monitoring portion 410-5n, the mask processing "presence" is likewise set to all the alarms, however, the continuation time (duration) is set to 0.3, 1800, 1.5 and 2.8 msec for these alarms, so that the mask processing continuation time (duration) of the performance monitoring portion 410-5n is set to be longer than that of the performance monitoring portion 410-21. This is an example based on the assumption that the time required for the switching is longer in the optical switch of (N×N) used for the first and second optical switches 405 is longer than that in the optical switch of (1×2) used in the branch portion 401.

CPU 420-10 writes the content read out from the monitoring management memory 420-13 into the mask register 420-3 to substantially start the mask processing (step 632). FIG. 8 shows the content set in the mask register 420-3 when the autonomic redundant switching operation in the present embodiment is carried out. Accordingly, in this case, the total mask number (n3) in step 632 is equal to 16.

When the mask pattern C is set, the counting operation of a timer is started (step 640). This is used to measure the continuation time (duration) for the various mask processing described later.

The autonomic redundant switching operation is carried out by the branching portion 401-1 and the selecting portion 402-N (step 652). At this time, by the switching operation of the branching portion 401-1 and the selecting portion 402-N, a alarm based on optical signal output interruption or the like may be observed in the performance monitoring portions 410-21, 410-31, 410-5N, 410-6N. However, since the mask processing is carried out previously, it is not recognized as an undesired alarm at the other sites in/out of the apparatus concerned.

Next, if there is a route switching request (610) in the normal operating loop 500' of the flow of FIG. 5, a mask pattern B for the route switching is set into the mask register 420-3 (step 631), and the route switching operation is likewise carried out (step 651) after the timer is started (640).

Figure 9:
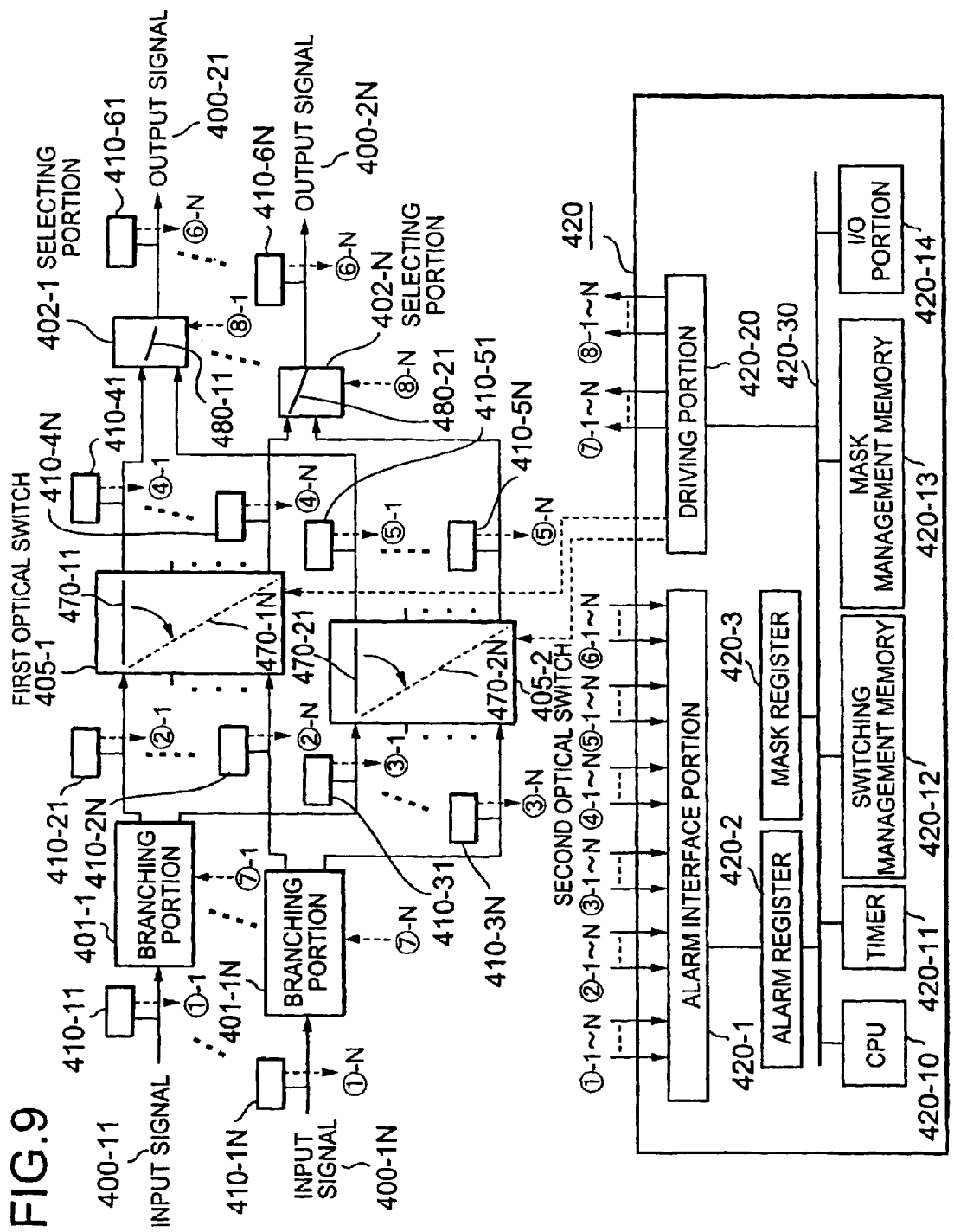
FIG. 9 is a construction diagram showing the operation of the optical switching apparatus of the embodiment according to the present invention.

For example as shown in FIG. 9, when the state that the selecting routes 470-11 and 470-21 are set in the first and second optical switches 405 respectively is switched to the state that the selecting routes 470-1N and 470-2N are set in the first and second optical switches 405 respectively, in the case of the hot standby system using the first optical switch 405-1 as the in-use system, the performance monitoring portions 410-41, 410-4N, 410-61, 410-6N in which alarms are expected to be detected are targeted for the mask processing.

FIG. 10 shows the content of the mask register 420-3 in the mask pattern B when the route switching operation is carried out. By carrying out such mask setting previously, an undesired alarm can be prevented from being recognized in/out of the apparatus concerned when the route switching operation is carried out.

Further, if there is a compulsory redundant switching request (620) in the normal practical use state 500' of the flow of FIG. 5, a mask pattern A for the compulsory redundant switching operation is set in the mask register 420-3 (step 630). After the timer is started (640), the mask processing is executed (step 640).

Here, as in the case of the autonomic redundant switching operation, the compulsory redundant switching operation is carried out on an optical-switch (405) basis or every specific route set in the optical switch 405. FIG. 11 shows a mask pattern when the compulsory redundant switching operation from the selecting route 470-1N to the selecting route 470-2N is carried out on a route basis shown in FIG. 6. The difference from the mask pattern C when the autonomic redundant switching operation in FIG. 8 is carried out resides in the presence or absence of the mask processing for the performance monitoring portion 410-4N. That is, in the compulsory redundant switching operation, it is assumed that no break-down alarm is detected in the normal operation, and thus the mask processing is necessary for the performance monitoring portion 410-4N.

When a predetermined time elapses after the route switching operation, the autonomic redundant switching operation or the compulsory redundant switching operation is carried out, the mask processing which has been set is released. The continuation time (duration) until the mask processing is released may be varied in accordance with the performance monitoring position or the type of the alarm, and thus it is stored in the monitoring management memory 420-13 shown in FIG. 3 (6, 9 or the like) previously together with the mask pattern. For convenience' sake of description, alarm masks (i) are called as (i=1, 2, 3, . . . ) in increasing order of the continuation time (duration) in each mask pattern.

In CPU 420-10, the continuation time (duration) thus stored and the count value of the timer 420-11 are compared with each other to judge for a specific alarm mask (i) whether the release time thereof has passed (step 660). If the release time has passed, the setting of the alarm mask (i) in the mask register 420-11 is released (step 670).

The above mask releasing processing is repeated while incrementing i one by one until i=1 to n1 (n2, n3) (step 690), and the processing is finally returned to the normal operation loop (500') when the release of all the alarm masks is completed (step 680).

As described above, according to the present invention, the operation modes of the route switching operation, the autonomic redundant switching operation and the compulsory redundant switching operation are discriminated from one another, and these operation modes are prevented from being executed at the same time. In addition, proper mask processing is carried out for every switching operation. Therefore, occurrence of an undesired alarm when each switching operation is carried out and a malfunction caused by the occurrence of the undesired alarm can be prevented.

Furthermore, in the above-described embodiment, the apparatus has such a construction that with respect to all the alarms detected by the performance monitoring portions, emission of only alarms set in the mask register is prevented. However, on the basis of the same technical idea, the apparatus may be designed so that only alarms which can be emitted are separately stored previously and a alarm detected by the performance monitoring portion is output only when it can be emitted.

Next, a second embodiment according to the present invention will be described. In this embodiment, communications are carried out between a transmission terminal 805-1 and a reception terminal 805-2 by using a transmitter 800 and a receiver 801.

The transmitter 800 and the receiver 801 are connected to each other by redundantly-arranged transmission routes 810-4 and 810-5, and also optical switches 830-1, 830-2 and 831-1, 831-2 for setting the route are redundantly arranged in each of apparatuses. Another communication apparatus (not shown) may exist between the transmitter 800 and the receiver 801. For example, a terminal 805-1, the transmitter 800, the receiver 801 and a reception terminal 805-2 correspond to the terminal 120-11, OADM 100-1, OADM 100-6 and the terminal 120-61. In this case, the transmission route 810-4 corresponds to the transmission route 200-1, OADM 100-2, the transmission route 200-2, OXC 110-1, the transmission route 200-6, OXC 110-3, the transmission route 200-7, OXC 110-2, the transmission route 200-12, OADM 100-4 and the transmission route 200-13 shown in FIG. 1, for example. Further, in this case, the transmission route 810-5 corresponds to the transmission route 200-3, OADM 100-3, the transmission route 200-4, OXC 110-1, the transmission route 200-5, OXC 110-2, the transmission route 200-14, OADM 100-5 and the transmission route 200-15 shown in FIG. 1, for example.

In this embodiment, the autonomic redundant switching operations (and the compulsory redundant switching operations) of the redundant optical switches and the redundant transmission routes are carried out in combination with each other. That is, a communication route including the connection of the first optical switch 830-1 of the transmitter 800, the first transmission route 810-4 and the first optical switch 831-1 of the receiver 801 is set as "0-system", a communication route including the connection of the second optical switch 830-2 of the transmitter 800, the second transmission route 810-5 of the transmitter 800, the second transmission route 810-5 and the second optical switch 831-2 of the receiver 801 is set as "1-system", and the autonomic redundant switching operation or the compulsory redundant switching operation is carried out between the 0-system and the 1-system on a system basis.

An input optical signal 810-1 having a single wavelength from the transmission terminal 805-1 to the transmitter 800 is branched by a branching portion 820-1, and input to one of the first optical switch 830-1 and the second optical switch 830-2 which are redundantly arranged. The signal for which the route setting is carried out by these optical switches 830 is wavelength-multiplexed into a wavelength-multiplexed signal by a wavelength multiplexing apparatus 850-2 or 850-4, and then output to one of the first transmission route 810-4 and the second transmission route 810-5 which are redundantly arranged.

At the receiver 801 at the counter side, the wavelength-multiplexed signal received through the first or second transmission route 810-4 or 810-5 is separated into single-wavelength signals by a wavelength separator 851-2 or 851-4. The respective optical signals are subjected to the route setting by the first optical switch 831-1 and the second optical switch 831-2, and any one of the optical signals is selected by a selecting portion 861-1 and output as a single-wavelength output signal 810-8 to the reception terminal 805-2.

Performance monitoring portions 840, 841 are arranged in front and rear of the first and second optical switches 830, 831 in the transmitter 800 and the receiver 801 so that the performance monitoring portions 840, 841 monitors the performance of the respective optical signals to thereby achieve proper RAS. The internal construction and functions of controllers 820 and 821 in both the transmitter and the receiver are the same as described in the above-described embodiment, and thus the description thereof is omitted. However, I/O portions 820-14 and 821-14 are connected to each other through a communication route 890 so that information needed for the switching control can be received/transmitted. Further, when another communication apparatus (not shown) exists between the transmitter 800 and the receiver 801, the second embodiment of the present invention may be constructed so that the communication (transmission/reception) of the switching control information with the communication apparatus can be performed.

Figure 12:
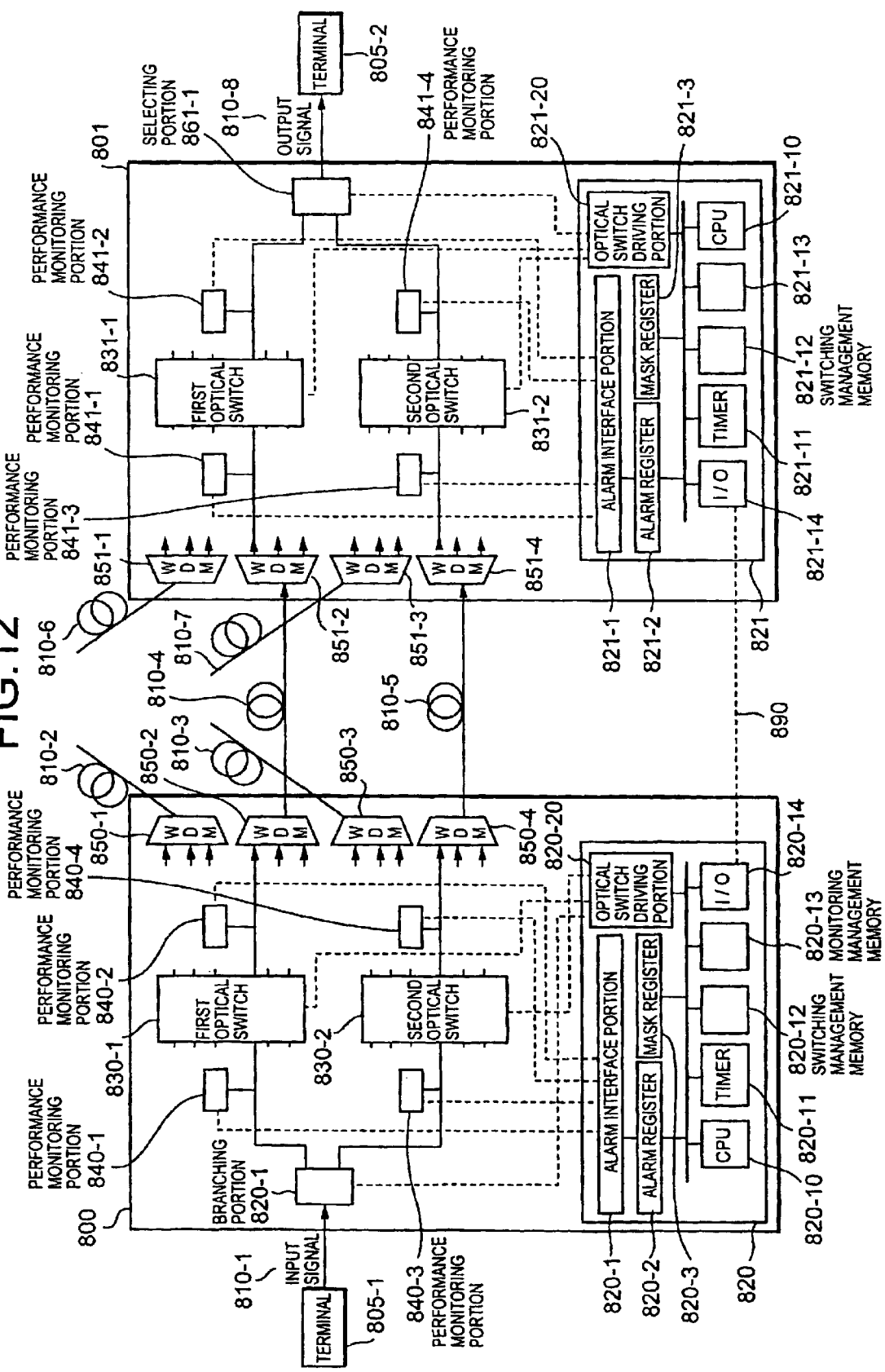
FIG. 12 is a construction diagram showing a second embodiment of the present invention.

In FIG. 12, only the single input/output signal is illustrated for convenience' sake. However, not only the input and output signals 810-1 and 810-8, but also other input and output signals actually exist. Therefore, plural branching portions 820-1, plural selecting portions 861-1 and plural performance monitoring portions 840, 841 are provided in association with the plural input and output signals. Further, each of the input signal 810-1 and the output signal 810-8 is a single-wavelength signal, and the wavelength of each signal may be varied every in port or invariable.

As in the case of the above-described embodiment, change of the connection route setting of each of the optical switches 830, 831 of the transmitter 800 and the receiver 801 will be referred to as "route switching", an operation of autonomically performing the switching operation between the 0-system and the 1-system by the apparatus when abnormality occurs will be referred to as "autonomic redundant switching operation", and an operation of compulsorily performing the system switching operation between the redundant systems will be referred to as "compulsory redundant switching operation". The autonomic redundant switching operation and the compulsory redundant switching operation are carried out by the switching operation of the branching portion 820-1 of the transmitter 800 and the selecting portion 861-1 of the receiver 801.

In this embodiment, the mask processing described in the above-described embodiment is carried out in each of the transmitter 800 and the receiver 801, and the communication (reception/transmission) of the alarm information and various switching control information is carried out between the transmitter 800 and the receiver 801 through I/Os 820-14, 821-14 and the communication route 890, whereby emission of undesired alarms, malfunction due to the undesired alarms, etc. can be prevented.

For example, when the route switching of the first optical switch 830-1 of the transmitter 800 is carried out, the controller 820 selects a proper mask pattern and sets it into the mask register 820-3 before the switching operation. At the same time, information on the route switching is transmitted from the I/O portion 820-14 through the communication route 890 and the I/O portion 821-14 to the controller 821 of the receiver 801, and a proper mask pattern is also set into each alarm monitoring portion of the receiver 801.

The same is satisfied with respect to the autonomic redundant switching operation. For example, when the break-down of the first optical switch 830-1 of the transmitter 800 is detected by the performance monitoring portion 840-2, the controller 820 selects a mask pattern and switches the branching portion 820-1 to the second optical switch 830-2 side. At the same time, information on this autonomic redundant switching operation is transmitted through the communication route 890 to the receiver 801. After a proper mask pattern is set, the selecting portion 861-1 is switched to the second optical switch 831-2 side, thereby performing the autonomic redundant switching operation.

When the break-down of the first optical switch 831-1 of the receiver 801 is detected by the performance monitoring portion 841-2, the controller 821 selects a proper mask pattern, and switches the selecting portion 861-1 to the second optical switch 831-2 side. At the same time, the information on the autonomic redundant switching is transmitted through the communication route 890 to the transmitter 800. After a proper mask pattern is set, the branching portion 820-1 is switched to the second optical switch 830-2 side, thereby performing the autonomic redundant switching operation.

The specific procedure of the alarm mask processing described above, etc. are the same as the above-described embodiment, and thus the description thereof is omitted.

The communication route 890 may be a physically separate line as shown in FIG. 12, or the signal of the communication route 890 may be wavelength-multiplexed to an optical main signal or the communication route 890 logically connected by an external controller (not shown) or the like.

When another communication apparatus (not shown) exists between the transmitter 800 and the receiver 801, the same mask processing is carried out on the communication apparatus by the transmission/reception of the control information through the communication route 890.

As described above, according to the second embodiment, the transmission/reception of the control information on each switching operation is performed between the apparatuses on the transmission route, so that when the switching operation is carried out on an apparatus, and an undesired alarm can be prevented from occurring in an apparatus at the downstream side of the apparatus concerned.

According to the present invention described above, emission of an undesired alarms can be prevented and thus occurrence of malfunction can be prevented when the route switching, the autonomic redundant switching or the compulsory redundant switching of the optical switch is carried out, so that a stable optical switching apparatus having high reliability can be practically used.

What is claimed is:

1. An optical transmission system comprising:

an optical transmission apparatus having first and second optical switches;

an optical receiving apparatus having third and fourth optical switches; and first and second transmission routes through which said first and second optical switches provided to said optical transmission apparatus are respectively connected to said third and fourth optical switches provided to said optical receiving apparatus, wherein said optical transmission apparatus has a branching portion for branching an input signal and outputting to any one of said first and second optical switches, and plural optical performance monitoring portions disposed of front and rear of said first and second optical switches to monitor optical signals, said optical receiving apparatus has a selecting portion for selecting and outputting any one of signals output from said third and fourth optical switches, and plural optical performance monitoring portions disposed of front and rear of said third and fourth optical switches to monitor optical signals, the switching of said branching portion and said selecting portion is carried out on the basis of monitoring results of said performance monitoring portions provided to said optical transmission apparatus or said optical receiving apparatus, thereby performing a switching operation of a redundant system of said optical transmission system, said optical transmission apparatus and said optical receiving apparatus transmits/receives control information so that alarms detected due to the route switching operation of an optical switch provided to each of said transmission apparatus and said receiving apparatus and the redundant system switching operation of said optical transmission system are at least concealed in both of said transmission apparatus and said receiving apparatus.

2. A method of an optical signal route setup in an optical transmission system having a redundant system which includes an optical transmission apparatus having first and second optical switches, an optical receiving apparatus having third and fourth optical switches, and first and second transmission routes through which said first and second optical switches provided to said optical transmission apparatus are respectively connected to said third and fourth optical switches provided to said optical receiving apparatus, wherein said optical transmission apparatus branches an input signal, carries out route setup in said first and second optical switches, outputs the input signal to said first and second transmission routes, and monitors the performance of the optical signal in front and rear of said first and second optical switches, and said optical receiving apparatus receives the input signal from said first and second optical transmission routes, carries out route setup in said third and fourth optical switches, any one of the input signals from said third and fourth optical switches selects and outputs as an output signal, and monitors the performance of the optical signal in front and rear of said third and fourth optical switches, and wherein a redundant system switching operation of said optical transmission system is performed by switching a route containing said first optical switch, said first transmission route and said third optical switch and a route containing said second optical switch, said second transmission route and said fourth optical switch to each other on the basis of the monitoring result of at least one performance monitoring portion provided to each of said optical transmission apparatus and said optical receiving apparatus, and said optical transmission apparatus and said optical receiving apparatus transmits/receives control information so that alarms caused by at least one of the route switching operation of an optical switch provided to each of said transmission apparatus and said receiver and the redundant system switching operation of said optical transmission system are concealed in both of said transmission apparatus and said receiving apparatus.

* * * * *